United States Patent
Yunus

[11] Patent Number: 5,848,383
[45] Date of Patent: Dec. 8, 1998

[54] SYSTEM AND METHOD FOR PRECISION COMPENSATION FOR THE NONLINEAR OFFSET AND SENSITIVITY VARIATION OF A SENSOR WITH TEMPERATURE

[75] Inventor: Mohammad Yunus, Fremont, Calif.

[73] Assignee: Integrated Sensor Solutions, San Jose, Calif.

[21] Appl. No.: 851,793

[22] Filed: May 6, 1997

[51] Int. Cl.[6] ........................................... G06F 17/00
[52] U.S. Cl. ........................ 702/104; 702/99; 702/107; 73/763; 73/765
[58] Field of Search .................... 364/483, 557, 364/571.01, 571.02, 571.03, 571.04, 571.07; 73/700, 708, 763, 765, 766, 716–721, 1.88, 768; 327/512, 513; 702/99, 103–107; 341/118–120

[56] References Cited

U.S. PATENT DOCUMENTS

| | | | |
|---|---|---|---|
| 4,198,677 | 4/1980 | Brunner et al. | 364/571.04 |
| 4,463,274 | 7/1984 | Swartz | 327/513 |
| 4,592,002 | 5/1986 | Bozarth, Jr. et al. | 364/571.03 |
| 4,836,442 | 6/1989 | Beckey | 364/557 |
| 5,053,692 | 10/1991 | Craddock | 73/766 |
| 5,241,850 | 9/1993 | Kawate | 73/1.88 |
| 5,319,370 | 6/1994 | Signore et al. | 341/120 |
| 5,398,194 | 3/1995 | Brosh et al. | 364/483 |
| 5,460,049 | 10/1995 | Kirsch | 73/708 |
| 5,581,247 | 12/1996 | Kelly | 364/571.07 |
| 5,604,684 | 2/1997 | Juntunen | 364/571.04 |
| 5,686,826 | 11/1997 | Kurtz et al. | 323/365 |

*Primary Examiner*—Louis M. Arana
*Assistant Examiner*—Bryan Bui
*Attorney, Agent, or Firm*—Sawyer & Associates

[57] ABSTRACT

A method and system for calibrating a sensor is disclosed The method and system include receiving data relating to a plurality of temperature parameters and providing polynomial compensation of a temperature coefficient (TC). When providing polynomial compensation of the temperature coefficient, the method and system further include providing a first output and adding a second value to the first output. The first output is a distal temperature multiplied by a first value.

16 Claims, 13 Drawing Sheets

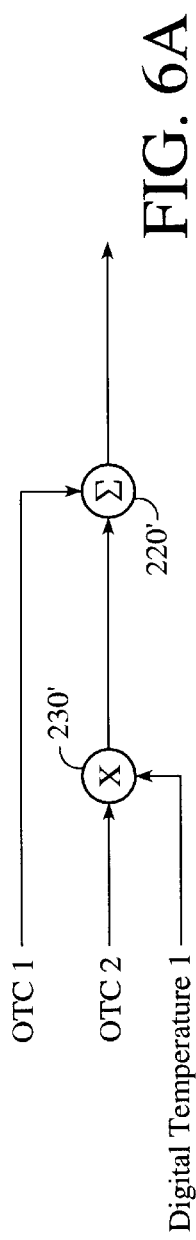
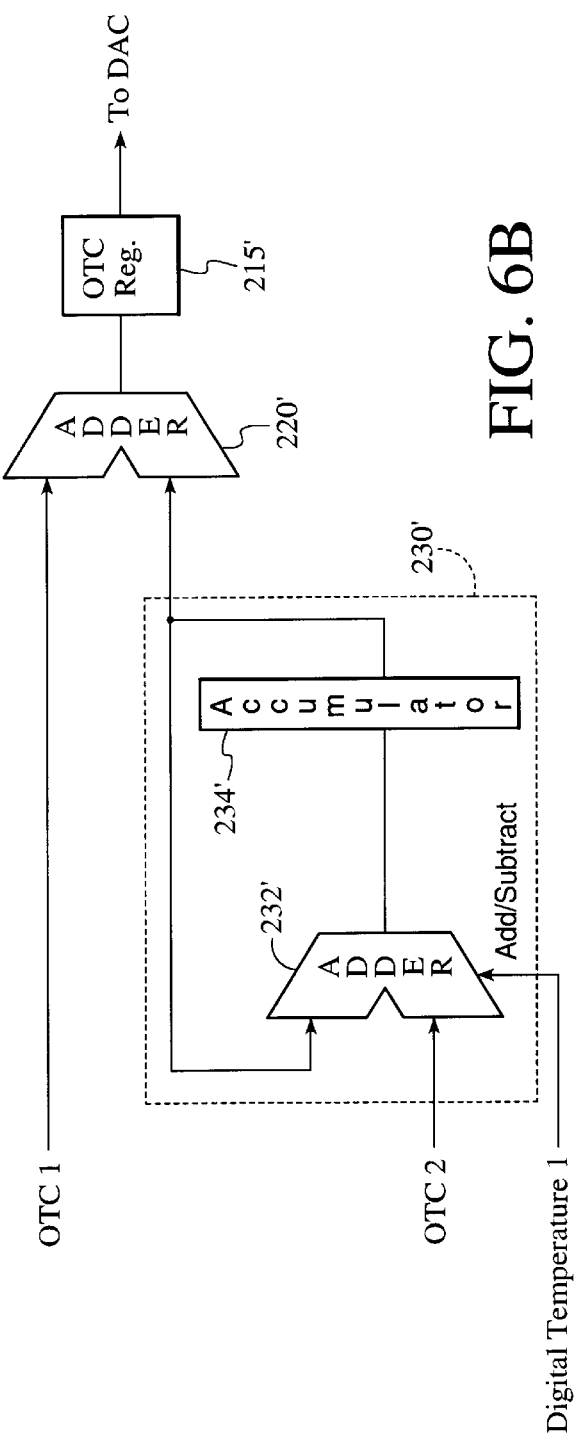

SYSTEM AND METHOD FOR PRECISION COMPENSATION FOR THE NONLINEAR OFFSET AND SENSITIVITY VARIATION OF A SENSOR WITH TEMPERATURE

FIELD OF THE INVENTION

The present invention relates generally to sensors and more particularly to improving the calibration of such sensors.

BACKGROUND OF THE INVENTION

Piezoresistive and capacitive sensors are being used in increasingly higher accuracy applications for sensing various changes in pressure and the like in a variety of environments. Because the output of these sensors typically varies over temperature, the sensors require compensation and calibration in order to achieve the accuracy and temperature stability requirements of these applications. The calibration of sensors typically requires the adjustment of four parameters to achieve optimum output performance over temperature-offset, offset temperature coefficient (OTC), signal gain, and gain temperature coefficient (GTC).

In general the transfer function of a sensor is given by:

$$Vsens = \text{Offset}_0 \cdot (1 + \alpha_1 \cdot T + \alpha_2 \cdot T^2 + \ldots + \alpha_n \cdot T^n) + S_0 \cdot (1 + \beta_1 \cdot T + \beta_2 \cdot T^2 + \ldots + \beta_n \cdot T^n) \cdot Q \qquad \text{Equation 1}$$

where:
Vsens is the sensor output voltage
$\text{Offset}_0$ is the sensor offset (output with zero excitation) at a reference temperature (e.g. 25° C.)
$\alpha_1$ is the first order temperature coefficient of the sensor offset
$\alpha_2$ is the second order temperature coefficient of the sensor offset
$\alpha_n$ is the $n^{th}$ order temperature coefficient of the sensor offset
T is the temperature difference from the reference temperature
$S_0$ is the sensor sensitivity or span at the reference temperature (e.g. 25° C.)
$\beta_1$ is the first order temperature coefficient of the sensor sensitivity
$\beta_2$ is the second order temperature coefficient of the sensor sensitivity
$\beta_n$ is the $n^{th}$ order temperature coefficient of the sensor sensitivity
Q is the physical parameter being sensed (e.g. pressure, acceleration, etc.)

For most sensor applications, all but the first order terms can be ignored so that Equation 1 becomes:

$$Vsens = \text{Offset}_0 \cdot (1 + \alpha \cdot T) + S_0 \cdot (1 + \beta \cdot T) \cdot Q \qquad \text{Equation 2}$$

However, for high accuracy sensor applications, the second order terms are usually included so that Equation 1 becomes:

$$Vsens = \text{Offset}_0 \cdot (1 + \alpha_1 \cdot T + \alpha_2 \cdot T^2) + S_0 \cdot (1 + \beta_1 \cdot T + \beta_2 \cdot T^2) \cdot Q \qquad \text{Equation 3}$$

To compensate this signal, a signal conditioning circuit is required which must subtract out the offset terms over temperature and provide amplification which varies with temperature to counteract the effect of the sensor span (TC). Traditionally, the signal conditioning has been done with opamps and laser trimmed resistors. However, this type of signal conditioning circuit is usually limited to providing first order correction of the temperature dependent terms. In addition this method is expensive as it requires the use of a laser and the solution is typically not monolithic (on a single integrated circuit) as the opamps and resistors are usually built on separate substrates.

An embodiment of a conventional digital compensation circuit 100 is shown in FIG. 1. In this embodiment, the differential signal from the sensor 5' is fed into an amplifier 102 which may have a gain of 1 or greater depending on the application. The output of this amplifier is fed into another amplifier stage 104 whose gain is controlled by the contents of a gain register 106. In addition, the offset and offset TC terms are added at summation point 114 in this stage using DACs 108, 110, 112 controlled by digital parameters. The compensation of the sensor sensitivity TC is done in the third stage 116 after the offset, offset TC and gain compensation. The third stage 116 may also have a gain of 1 or greater depending on the application. The final stage is an output buffer 111.

In this circuit, the temperature, T, is sensed using an on-chip proportional to absolute temperature (PTAT) circuit 122. The analog signal representing T is digitized using an analog-to-digital converter 124. The digital word representing T is then used to control two DACs 110 and 120, one for the offset TC compensation and the other for the gain TC compensation. Digital information representing the values of the compensation terms, is serially fed into an on-chip control unit 125. The individual bits are decoded and sent to the various DACs 108, 110, 112, 118 and 120. Once the correct binary code has been selected to center the sensor characteristic in the specified range, the code is stored using a digital storage method such as $$Vout = (Vsens + Voff + Votc \cdot T) \cdot \text{Gain}_0 \cdot (1 + \delta \cdot T) \qquad \text{Equation 4}$$

Combining equations 3 and 4 gives:

$$Vout = [S_0 \cdot Q \cdot (1 + \beta_1 \cdot T + \beta_2 \cdot T^2) + \text{Offset}_0 \cdot (1 + \alpha_1 \cdot T + \alpha_2 \cdot T^2) + Voff + Votc \cdot T] \cdot \text{Gain}_0 \cdot (1 + \delta \cdot T) \qquad \text{Equation 5}$$

where:
Vout is the calibrated sensor output voltage (output of conditioning circuit)
$\text{Gain}_0$ is the gain of the compensating amplifier at the reference temperature
Voff is the offset added by the conditioning circuit
$Votc \cdot T$ is the temperature dependent component of the offset added by the conditioning circuit
$\delta$ is the temperature dependent component of the gain of the compensating amplifier which counteracts the temperature dependent component of the sensor sensitivity.

The calibration of the sensor involves making measurements of Vout at various values of Q and various temperatures and thereby deducing the values of Voff, Votc, $\text{Gain}_0$ and $\delta$ to minimize the error between Vout and the ideal sensor characteristic. Ideally the Voff and $\text{Gain}_0$ terms would be found first using measurements at the initial calibration temperature at minimum and maximum Q. The temperature dependent terms would then be found by an additional set of measurements at high (or low) temperature.

By setting:

$$Voff = -\text{Offset}_0$$

$$Votc = -\text{Offset}_0 \cdot \alpha_1$$

and $\delta = -\delta_1$
equation 5 becomes:

$$Vout=S_0 \cdot Q \cdot Gain_0 \cdot [1+T^2 \cdot (\beta_2+\delta \cdot \beta_1)_2+T^3 \cdot \delta \cdot \beta_2]+Offset_0 \cdot \alpha_2 \cdot Gain_0 \cdot (1+\delta \cdot T) \cdot T^2 \quad \text{Equation 6}$$

The desired term is simply $S_0 \cdot Q \cdot Gain_0$. All the other terms arise because this circuit only corrects for linear variations of the sensor offset and sensitivity with temperature. In high accuracy applications these extra terms may limit the usability of the sensor since it may be impossible to calibrate the sensor within the desired specification.

Accordingly, what is needed is a system and method to allow for more accurate calibration of sensors. The system and method should be easy to implement and cost effective. The present invention addresses such a need.

SUMMARY OF THE INVENTION

The method and system provide a digital compensation circuit for calibrating a sensor. The compensation circuit comprises a serial communication circuit for receiving data relating to a plurality of parameters, and means coupled to the serial communication circuit for providing polynomial compensation of a temperature coefficient (TC), wherein the polynomial compensation is provided by an approximation of a high order behavior of the sensor by a polynomial function.

The polynomial compensation means further comprises means for providing a first output. The first output is a first value multiplied with a digital temperature. Adder means are coupled to the first output providing means and the serial communication circuit. The adder means add a second value to the first output.

BRIEF DESCRIPTION OF THE DRAWINGS

FIG. 6a depicts one embodiment of the functionality of a multiply add block for calibrating the temperature offset and temperature coefficient of offset.

FIG. 6b illustrates one embodiment of a multiply-add block to calibrate the temperature offset and temperature coefficient of offset.

DETAILED DESCRIPTION

The present invention relates to an improvement of a calibration system for a sensor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention is an improvement over conventional calibration schemes. In the present invention the higher order behavior of sensor offset and sensitivity with temperature are approximated by polynomial functions. In one embodiment of the present invention, the offset and sensitivity behavior is approximated by a second order approximation. In so doing a highly accurate sensor calibration is provided. To more particularly describe the features of the present invention refer now to the following discussion in conjunction with the figures.

U S. patent application Ser. No. 08/674,028, entitled "A SYSTEM AND METHOD FOR HIGH ACCURACY CALIBRATION OF A SENSOR FOR OFFSET AND SENSITIVITY VARIATION WITH TEMPERATURE" filed on Jul. 1, 1996, which is assigned to the assignee of the present invention, discloses a system and method for calibration of a sensor using a piece-wise linear approximation. The above identified application is incorporated by reference herein. The present invention addresses calibration for higher order terms in the offset temperature coefficient and sensitivity temperature coefficient.

Figure 1:
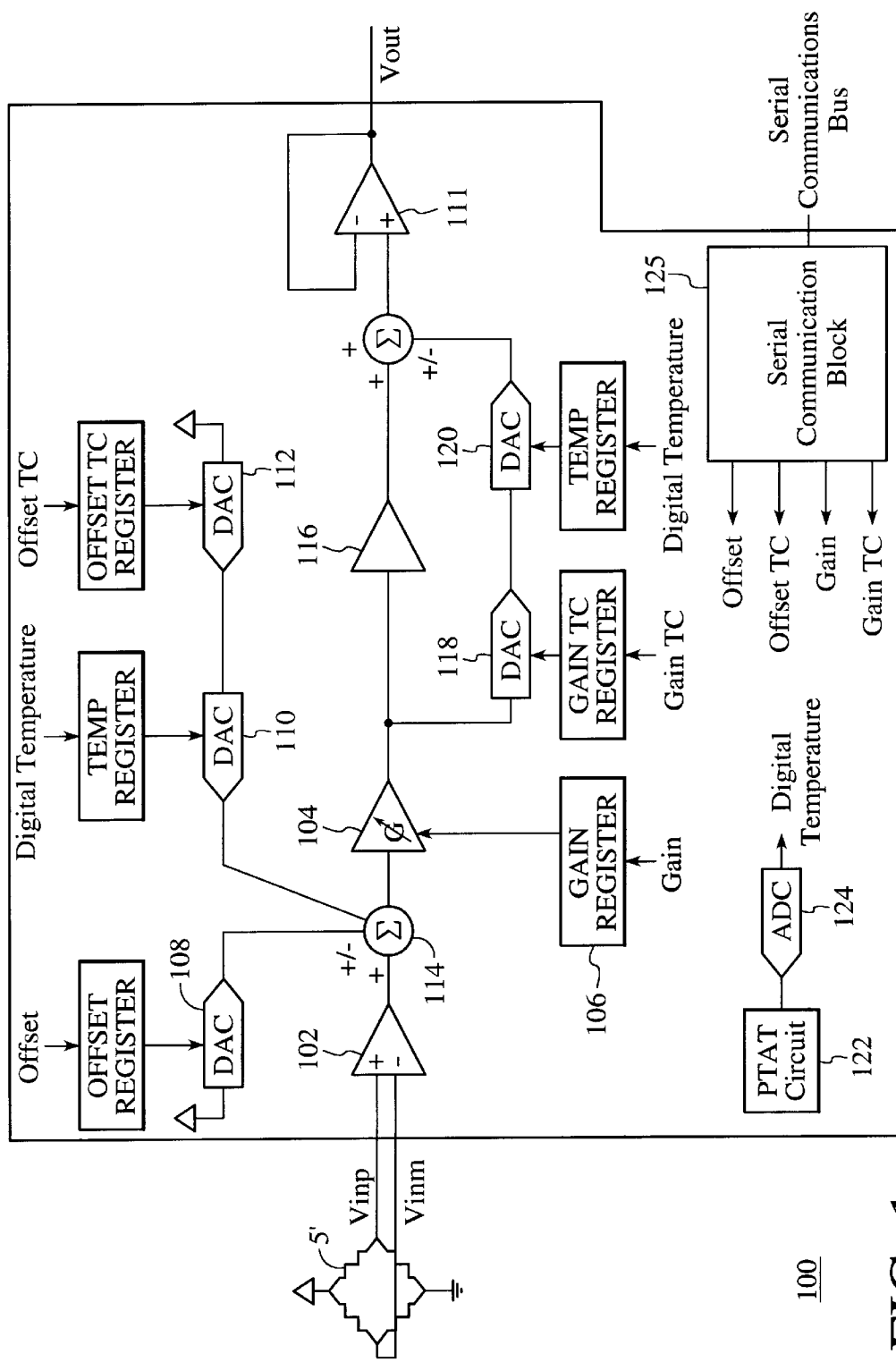
FIG. 1 is a diagram of a conventional sensor calibration circuit.
Figure 2:
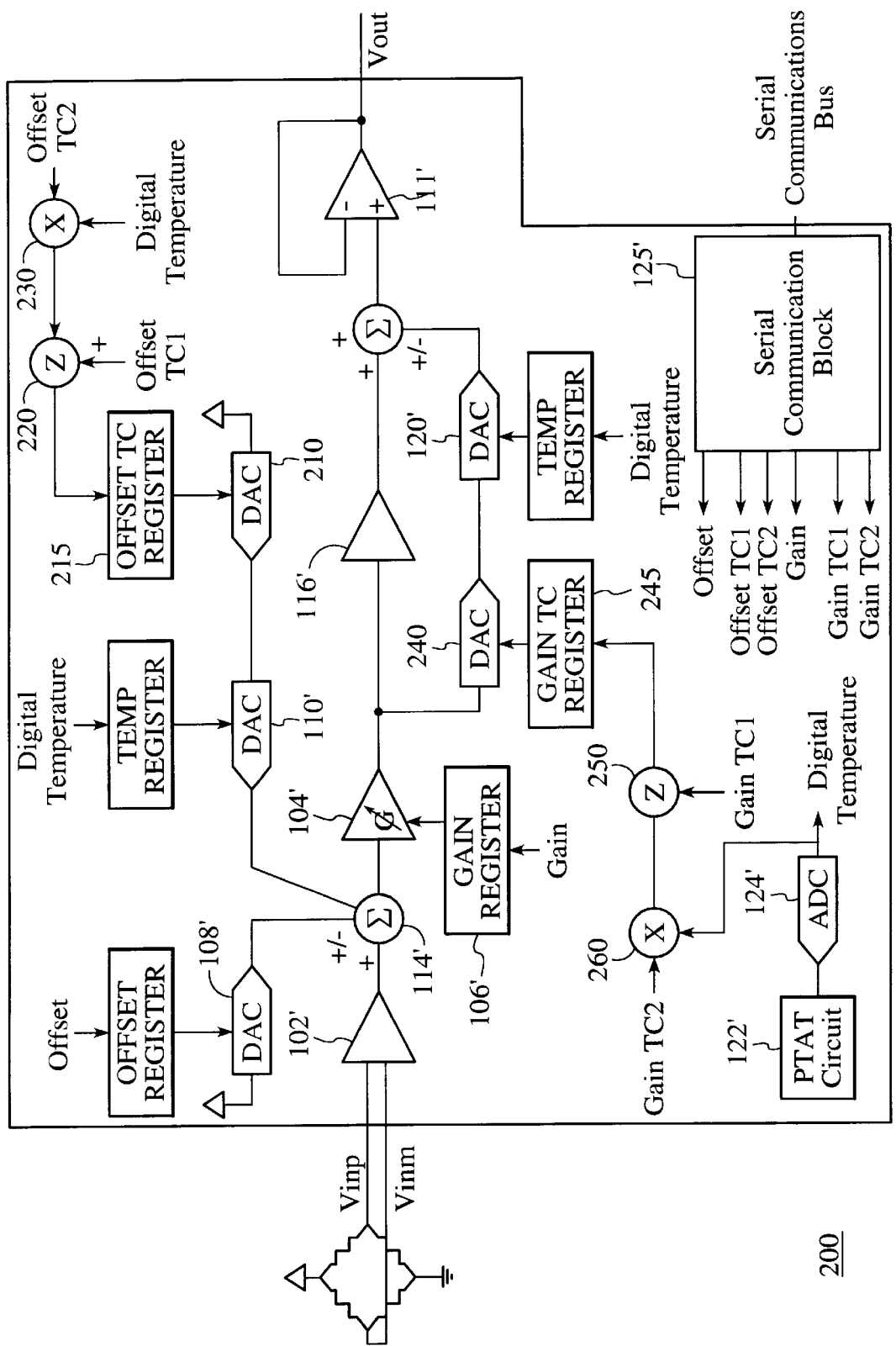
FIG. 2 is a block diagram of a high accuracy calibration system 200 in accordance with the present invention.

FIG. 2 is a block diagram of a high accuracy calibration system 200 in accordance with the present invention. As is seen system 200 has many of the common components as those shown in system 100 of FIG. 1. Those components are given similar designations as described in FIG. 1. The transfer function of FIG. 2 is given by:

$$Vout=(Vsens+Voff+(Votc1+Votc2*T)*T) *Gain_0*(1+(GTC1+GTC2*T)*T) \quad \text{Equation 7}$$

Combining equations 3 and 7 gives:

$$Vout = \left[ \begin{array}{c} S_0 \cdot Q \cdot (1 + \beta_1 \cdot T + \beta_2 \cdot T^2) + Offset_0 \cdot (1 + \alpha_1 \cdot T + \alpha_2 \cdot T^2) \cdot \\ +Voff + (Votc1 + Votc2T) \cdot T \cdot \end{array} \right] \cdot Gain_0 \cdot (1 + (GTC1 + GTC2 \cdot T) \cdot T) \quad \text{Equation 8}$$

$Votc1*T$ is the temperature dependent component of the offset added by the conditioning circuit $Votc2*T^2$ is the second order temperature dependent component of the offset added by the conditioning circuit GTC1 is the temperature dependent component of the gain of the compensating amplifier which counteracts the temperature dependent component of the sensor sensitivity GTC2 is the second order temperature dependent component of the gain of the compensating amplifier which counteracts the temperature dependent component of the sensor sensitivity.

The calibration of the sensor involves making measurements of Vout at various values of Q and various temperatures. The values of Voff, Votc$_1$, Votc$_2$, Gain$_0$, GTC1, GTC2 are utilized to minimize the error between Vout and the ideal sensor characteristic. Ideally, the Voff and Gain$_0$ terms would be found first using measurements at the initial calibration temperature and minimum and maximum Q. The temperature dependent terms would then be found by an additional set of measurements at high and/or low temperature. The embodiment of FIG. 2 provides a second order approximation to the sensor behavior.

By setting:

Voff=−Offset0

Votc1=−Offset$_0$*α$_1$

Votc2=−Offset$_0$*α$_2$

GTC1=β$_1$

GTC2=−β$_1$GTC1−β$_2$ equation 8 becomes:

$$V_{out} = \left[ S_0 \cdot Q \cdot (1 + \beta_1 \cdot T + \beta_2 \cdot T^2) + \text{Offset}_0 \cdot (1 + \alpha_1 \cdot T + \alpha_2 \cdot T^2) \cdot \right. \\ \left. + V_{off} + (V_{otc1} + V_{otc2}T) \cdot T \cdot \right] \cdot \text{Gain}_0 \cdot (1 + (GTC1 + GTC2 \cdot T) \cdot T) \quad \text{Equation 9}$$

Consequently, the embodiment depicted in FIG. 2 provides second order corrections to the offset temperature and sensitivity with temperature. However, the concepts and intent of calibration circuit 200 can be extended to provide polynomial correction of higher order errors.

The second order approximation for offset TC correction is implemented in the calibration system 200 of FIG. 2 by providing a multiplier 230 for multiplying the digital temperature with a second offset temperature coefficient, OTC2, with the digital temperature. Coupled to the multiplier is an adder 220, for adding the output of multiplier 230 to a first offset temperature coefficient, OTC1.

Figure 3:
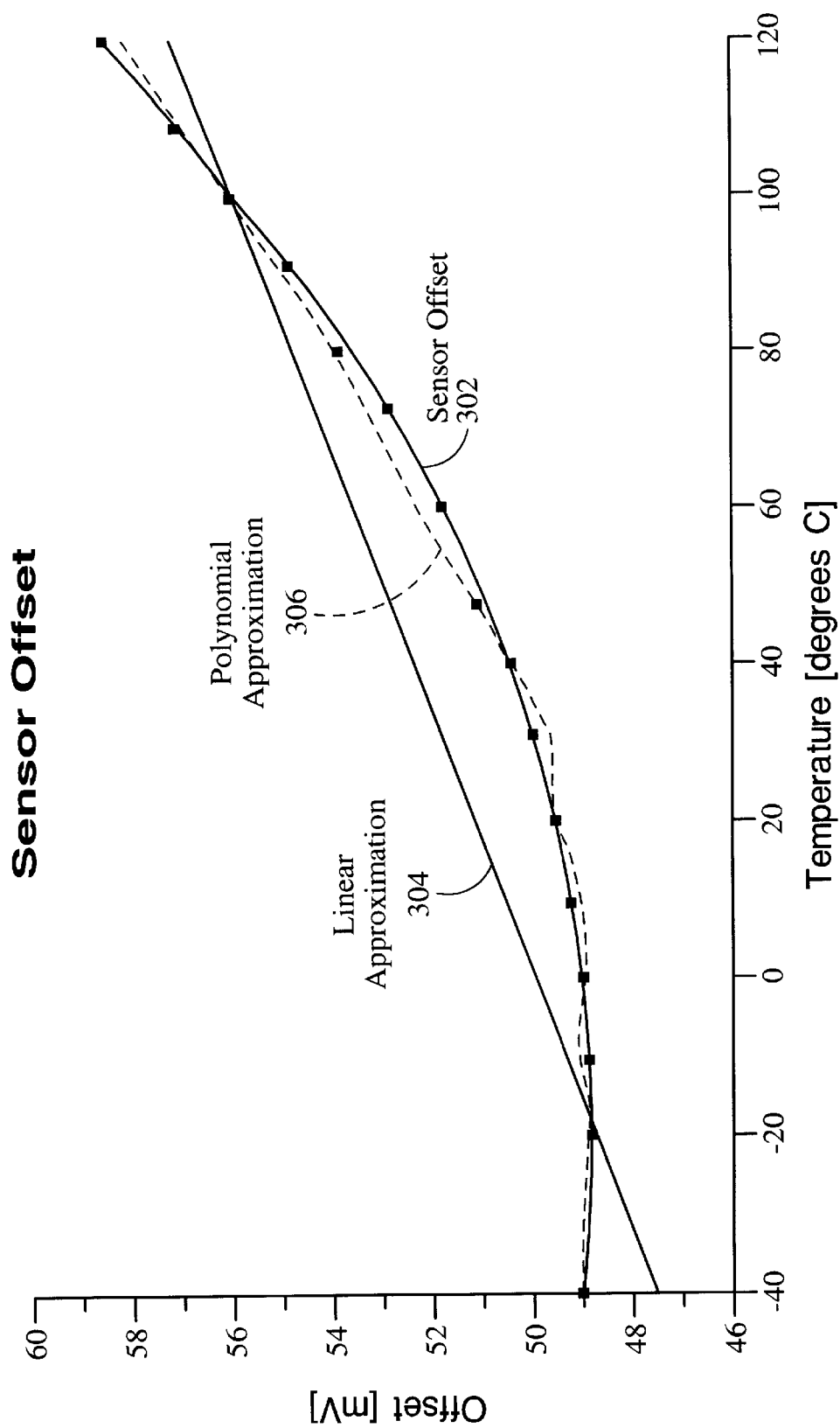
FIG. 3 shows typical sensor offset behavior together with a linear approximation and a polynomial approximation using the present invention.

FIG. 3 shows typical sensor offset behavior 302 together with a linear approximation 304 such as that provided by the circuit 100 in FIG. 1, and a polynomial, in this embodiment second order, approximation 306 such as that provided by the circuit 200 of FIG. 2 of the present invention. As is seen, the polynomial approximation more closely follows the sensor offset behavior. Similarly, a polynomial approximation can be used for correcting the behavior of the temperature coefficient of the sensitivity of the sensor.

Figure 4:
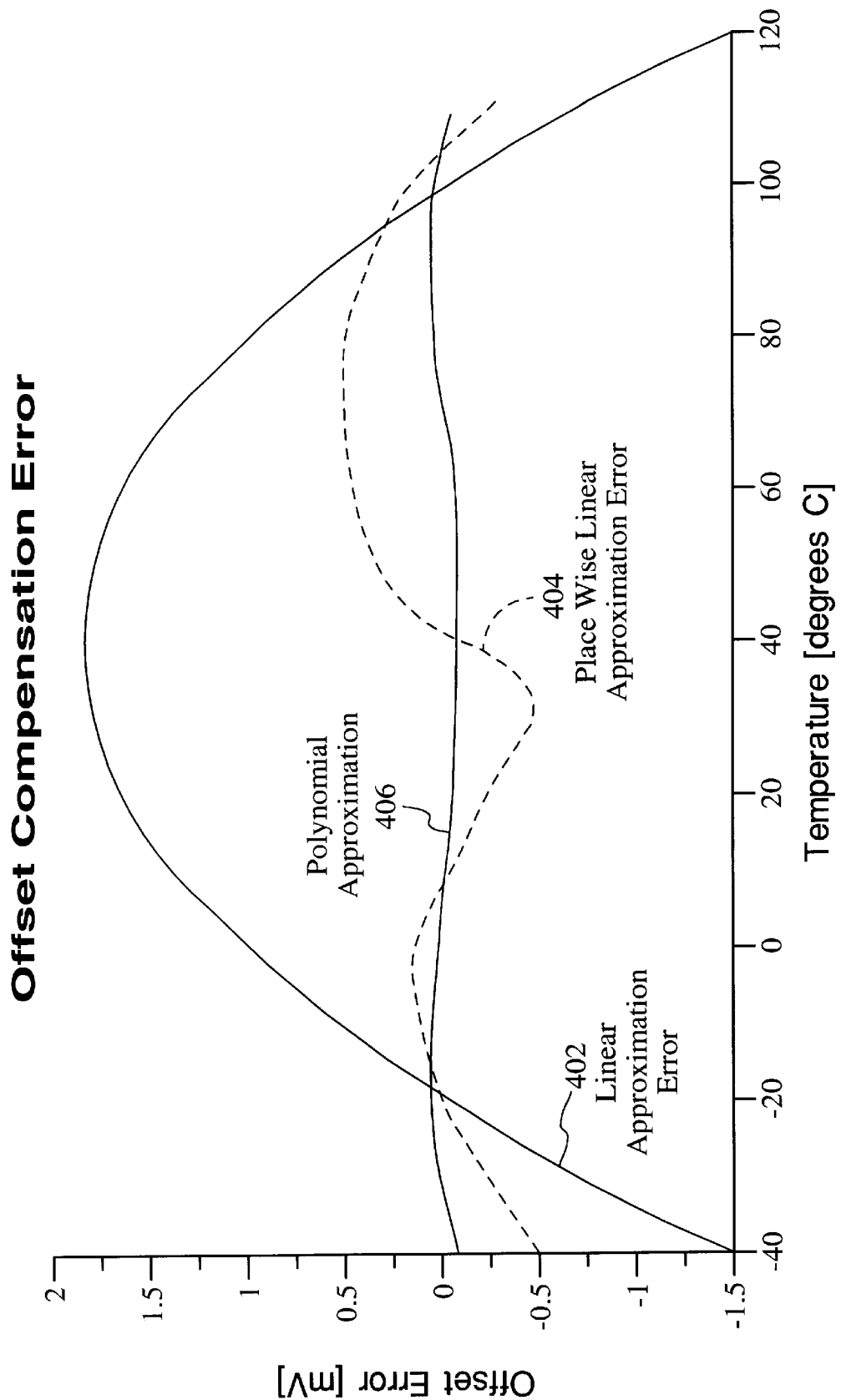
FIG. 4 illustrates the residual errors in the offset term for both the linear approximation and the polynomial approximation method.

To further illustrate this point, FIG. 4 contains waveforms that show the residual errors in the offset term for both the linear approximation 402, the piecewise linear approximation 404, and polynomial approximation 406. As is seen, the polynomial approximation error is clearly smaller thus allowing for higher accuracy sensor compensation.

Figure 5:
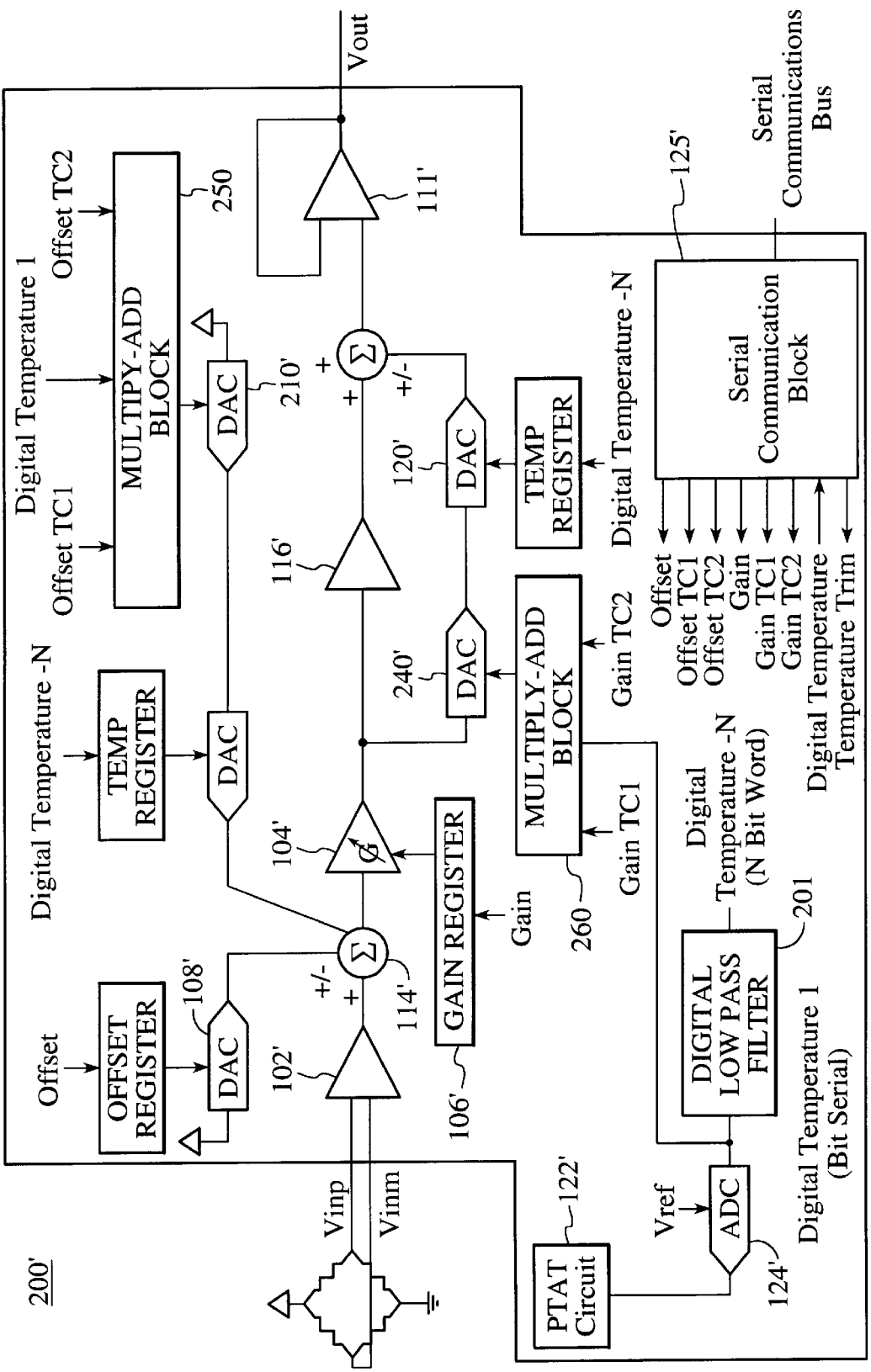
FIG. 5 is a block diagram of a second embodiment of a high accuracy calibration system in accordance with the present invention.

In one embodiment of the system 200 of FIG. 2, temperature T is represented as a ten (10) bit digital word. However, another form for the temperature T is the digital pulse density of a serial bit stream. For example, the midscale temperature of the ten bit digital word is 512. This midscale also corresponds to a pulse density of bit serial temperature equal to 50%. Thus, for each 1024 counts, there would be 512 ones (1's) and 512 zeroes (0's). FIG. 5 depicts one embodiment of a calibration system 200' utilizing pulse density to represent the temperature for at least some calculations.

The embodiment of FIG. 5 contains many of the elements of FIGS. 1 and 2. Consequently, these elements are given similar designations as in FIGS. 1 and 2. In order to digitize the temperature, the temperature is first sensed with PTAT circuit 122'. Using a reference voltage, Vref and the analog to digital converter 124' the temperature is converted to a pulse density proportional to the actual temperature minus the room temperature, i.e., T−25° C., where 25° C. is assumed to be the room temperature. This pulse density is used in multiply-add blocks 250 and 260. Digital low pass filter 201 then converts the pulse density to an N bit digital word representing the temperature.

Because the calibration system 200' shown in FIG. 5 uses a serial representation for the temperature, the multiply-add block 260, as well as multiply-add block 250, can be constructed very efficiently using conventional adders. FIG. 6a depicts the functionality provided by multiply-add block 250. As is apparent from FIG. 6a, multiply-add block 250 provides the same functions as blocks 220 and 230 of FIG. 2. FIG. 6b depicts the components used to construct multiply-add block 250 in one embodiment of the calibration system 200'. Multiply-add block 250 includes multiplier 230', constructed of adder 232', accumulator 234', and adder 220'. These components supply the same functions as multiplier 230 and adder 220 of FIG. 2. In addition, multiply-add block 250 contains OTC register 215'. Register 215' is coupled to DAC 210'.

In one embodiment of calibration system 200', accumulator 234' (see FIG. 6b) begins at zero. In this embodiment, OTC2 is added to the increase in accumulator 234' if the digital temperature is a logical 1 and subtracted from the sum in accumulator 234' if the temperature is a logical 0. In one embodiment, this step is repeated for M serial bits of the digital temperature. M is typically 512 or 1024. The final sum in the accumulator 234' is the product of OTC2 and the pulse density of the digital temperature. This product is then added to OTC1 by adder 220'. Finally, the sum of OTC1 and OTC2*T is latched to the OTC register 215' which controls the DAC 210'. This method and system can also be used for calibrating the gain using the multiply-add block 260. Note that an embodiment of the method and system could calibrate offset and offset coefficient (TC) temperature only, calibrate sensitivity and sensitivity TC only, or calibrate both offset TCs and sensitivity TC.

Figure 7:
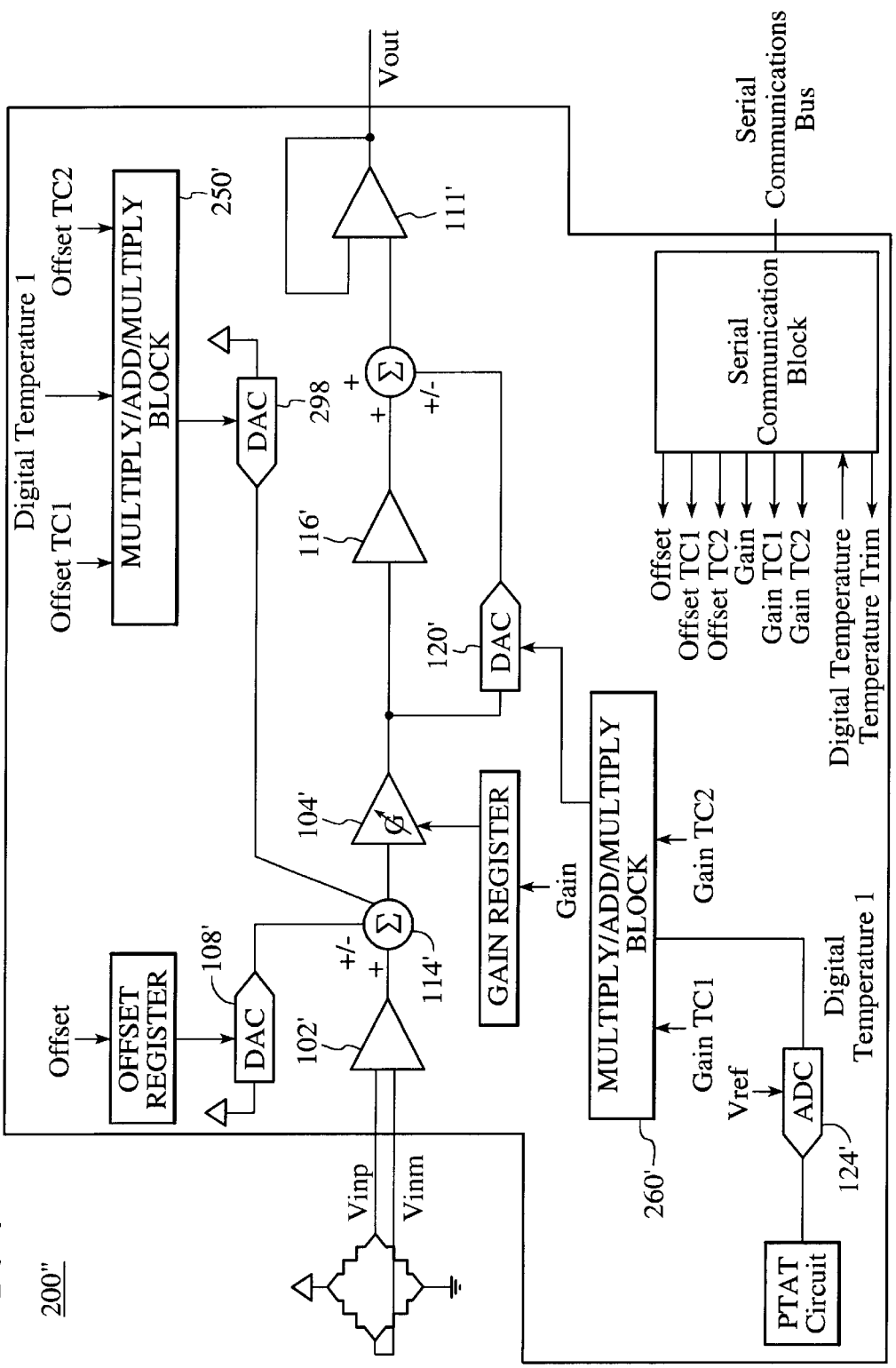
FIG. 7 depicts a third embodiment of a high accuracy calibration system in accordance with the present invention.

FIG. 7 displays a third embodiment of the calibration system 200". Many of the elements of the calibration system 200" are the same as for FIGS. 1, 2, and 5. These components are designated similarly as in FIGS. 1, 2, and 5. The calibration system 200" uses only one DAC 298 for offset and offset TC compensation. In addition, the calibration system 200" replaces the filter 201 shown in FIG. 5, with additional logic. Thus, the multiply-add blocks 250' and 260' of calibration system 200" output the full second order temperature correction to offset and gain, respectively, rather than outputting a first order correction which is later multiplied by the temperature, as in FIG. 5, system 200'.

Figure 8A:
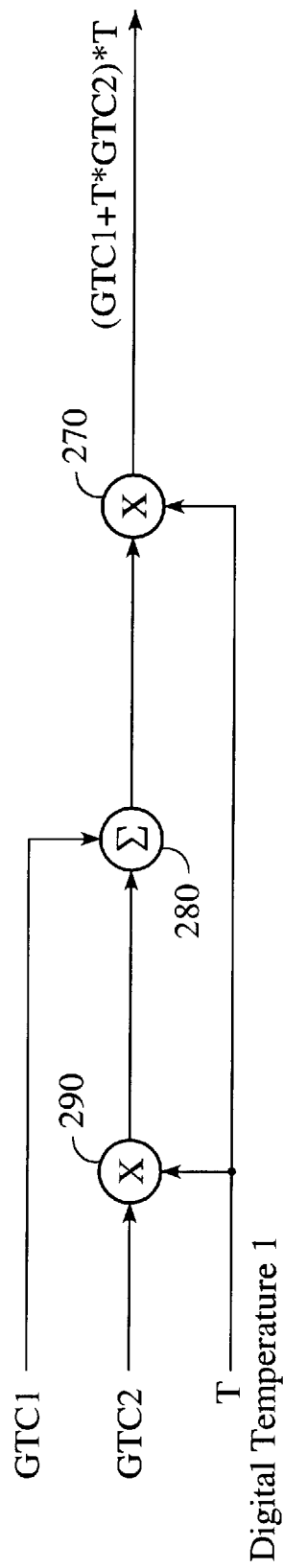
FIG. 8a depicts one embodiment of the functionality of a multiply add block for calibrating the sensitivity and temperature coefficient of sensitivity.
Figure 8B:
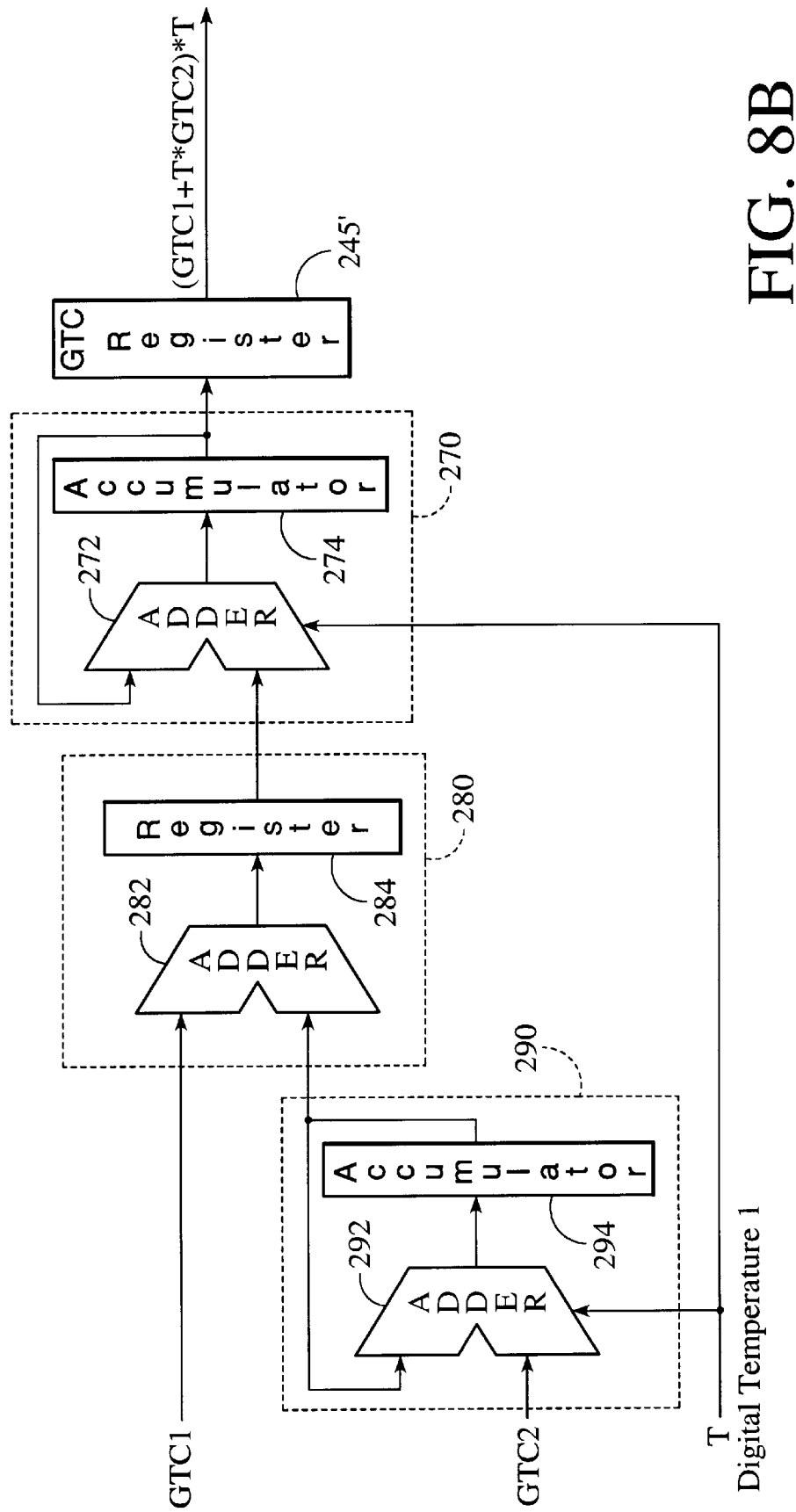
FIG. 8b depicts one embodiment of a multiply-add block to calibrate the sensitivity.
Figure 9A:
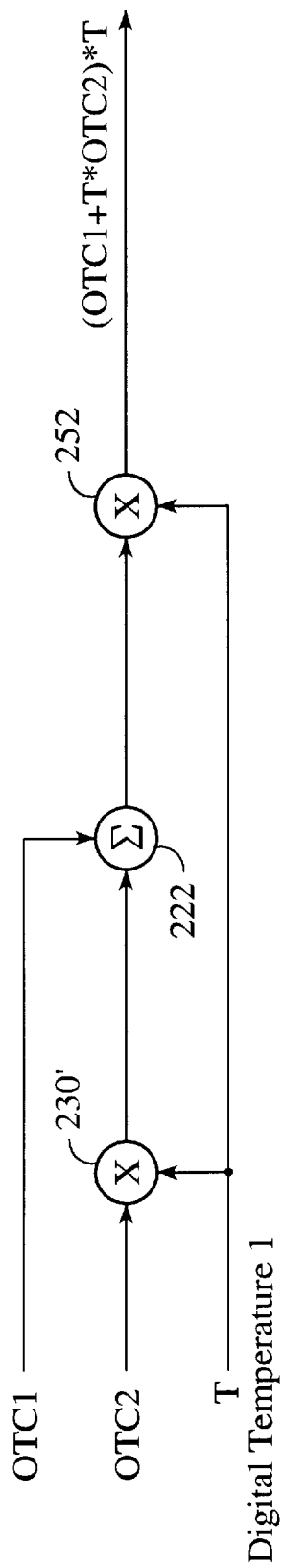
FIG. 9a depicts one embodiment of the functionality of a multiply add block for calibrating the temperature offset.
Figure 9B:
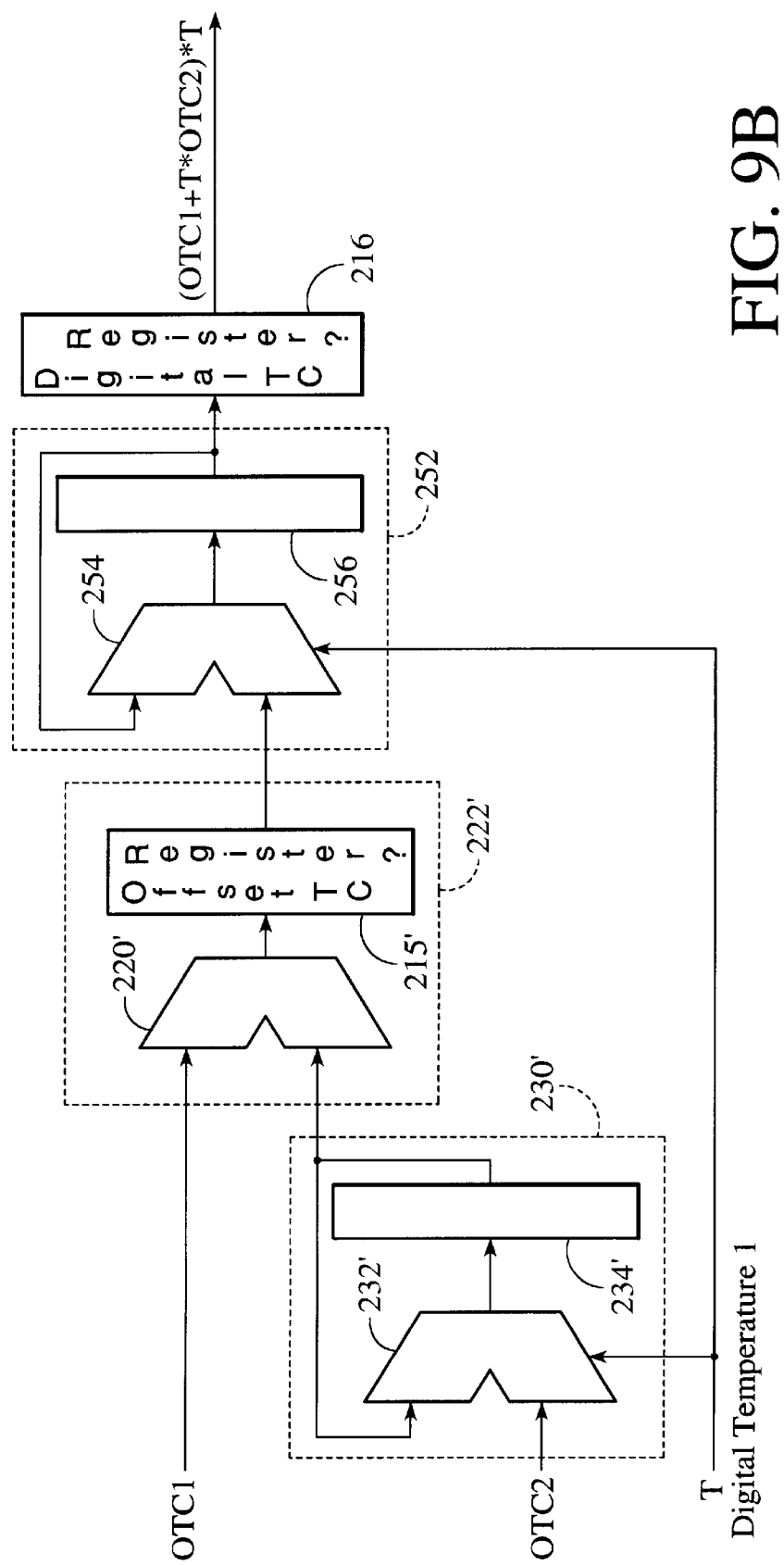
FIG. 9b illustrates one embodiment of a multiply-add block to calibrate the temperature offset.

FIG. 8a displays the functionality of multiply-add block 260'. Similarly, FIG. 9a displays the functionality of multiply-add block 250'. FIGS. 8b and 9b display block diagrams of multiply-add blocks 260' and 250', respectively. As in calibration system 200' of FIG. 5, the calibration system 200" of FIG. 7 utilizes both a digital word representation and a pulse stream density representation of temperature. Consequently, the multiply-add blocks 250' and 260' can be constructed using conventional adders, as is shown in FIGS. 9b and 8b, respectively. This structure permits a significant saving of logic complexity, resulting in a smaller die area, lower cost implementation. Both multiply-add blocks 250' and 260' output a second order correction to the temperature offset and gain, rather than a first order correction which later undergoes an additional multiplication.

Because the temperature of the environment typically changes significantly more slowly than a calibration can be performed, a single multiply-add block may be used to calibrate both offset temperature and sensitivity. Use of a common time multiplexed multiply-add block further reduces the amount of hardware required to calibrate offset and gain TCs. Another advantage of such a multiply-add block is that as the scaling down of silicon chips continues as technology advances, reducing size of the hardware.

Figure 10:
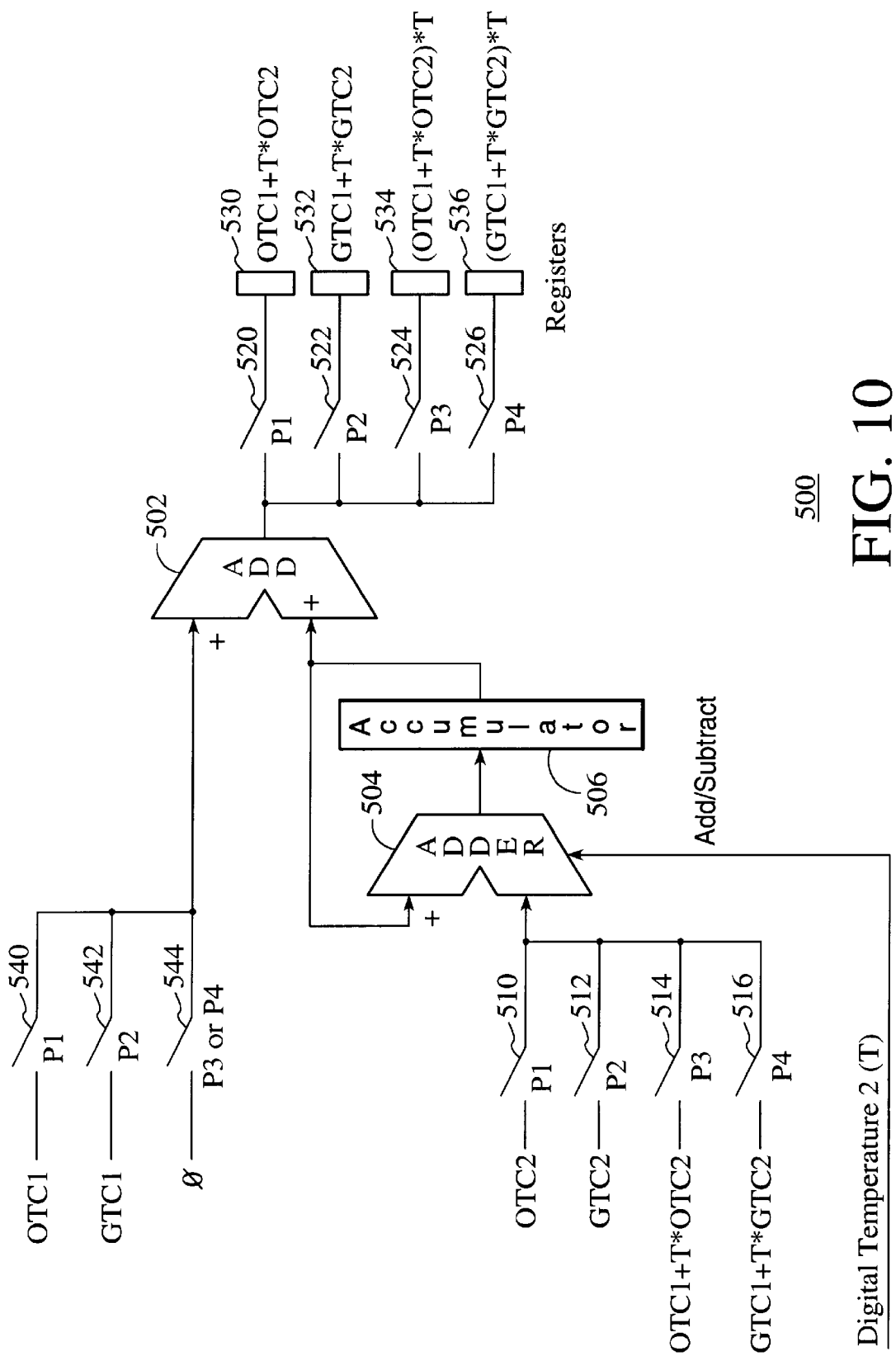
FIG. 10 illustrates one embodiment of a multiply-add block to calibrate both temperature offset and sensitivity.

A block diagram of one embodiment of such a multiply-add block 500 is depicted in FIG. 10. The adder 504 and the accumulator 506 perform the multiply operation. Adder 502 performs the add operation. When control signal P1 is active, switches 510, 520, and 540 are closed, the output of the multiply-add block 500 is an offset temperature correction coefficient and is routed to register 530. Register 530 outputs the quantity OTC1+OTC2*T This quantity can later be again multiplied by the temperature to produce a second order correction term. When the P2 signal is active, switches 512, 522, and 542 are closed, and the multiply-add block 500 performs a sensitivity TC correction which is routed to register 532.

Figure 11:
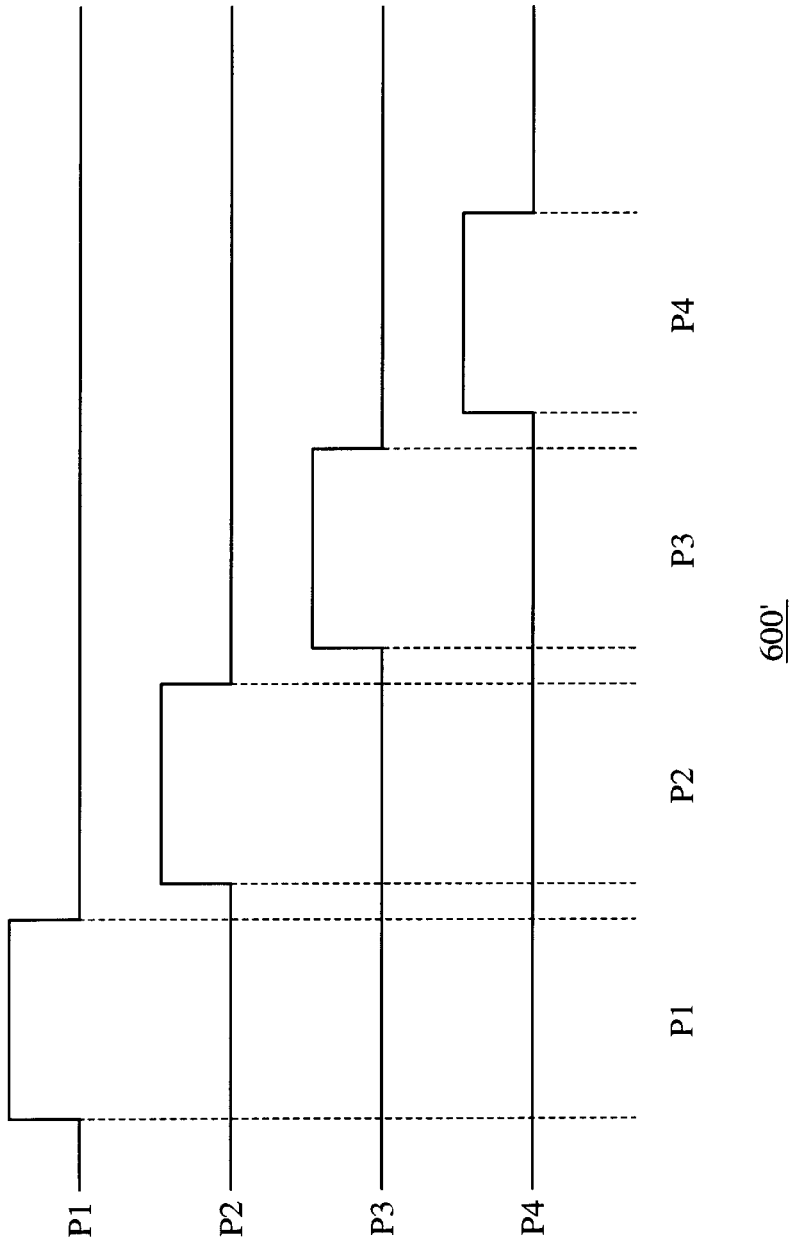
FIG. 11 depicts a timing diagram of the switching phases for the embodiment of the multiply-add block shown in FIG. 9a and 9b.

The correction coefficient is GTC1+GTC2*T. This quantity may later be again multiplied by temperature to provide second order corrections. When the P3 signal is active, switches 514, 524, and 544 are closed, the multiply-add block 500 performs a second order offset temperature correction which is output to register 524. The correction when the P3 switches are closed is (OTC1+OTC2*2)*T. Finally, when the P4 signal is active, switches 516, 526, and 544 are closed, a second order gain TC correction is performed. The correction is (GTC1+GTC2*T)*T, and is output to register 536. One timing diagram 600 for the phases for each set of control switches is shown in FIG. 11.

Although the preferred embodiment discussed here only includes means for providing second order compensation for sensor offset TC and sensitivity TC, one of ordinary skill in the art will know that the present invention can be extended to higher order polynomial corrections. It should also be clear that the present invention can also be used to correct for the temperature coefficient of the sensor linearity error. The sensor linearity error is the deviation of the sensor transfer characteristic (that is, sensor output versus Q where Q is the parameter being sensed) from an ideal straight line. In addition, one of ordinary skill in the art will recognize that a particular sensor may require polynomial compensation of offset TC or of sensitivity TC or of linearity TC or PSRR and PSRR TC or other performance variables and it would be within the spirit and scope of the present invention to provide polynomial compensation only of those parameters requiring it to meet the accuracy requirements.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

I claim:

1. A digital compensation circuit for calibrating a sensor comprising:

an interface circuit for receiving data relating to a plurality of temperature parameters; and means coupled to the interface circuit for providing polynomial compensation of a temperature coefficient (TC), the polynomial compensation means including:

means for providing a first output, the first output being a first value multiplied with a digitized temperature; and means coupled to the first output providing means and the interface circuit for adding a second value using the first output.

2. The circuit of claim 1 in which the TC is a temperature coefficient of the sensitivity of a sensor.

3. The circuit of claim 1 in which the TC is a temperature coefficient of the offset of a sensor.

4. The circuit of claim 1 further comprising:

means coupled to the first output providing means and to the adder and multiply accumulator means for multiplexing a plurality of input signals to the first output providing means and to the adder means.

5. The circuit of claim 4 wherein the plurality of signals further comprise:

a plurality of temperature coefficient of the sensor offset calibration values; and a plurality of temperature coefficient of the sensor sensitivity values.

6. The circuit of claim 5 wherein the plurality of signals further comprise:

a first temperature coefficient of the sensor offset calibration value plus a digitized temperature multiplied by a second temperature coefficient of the sensor offset calibration value; and a first temperature coefficient of the sensitivity of the sensor value plus a digitized temperature multiplied by a second temperature coefficient of the sensitivity of the sensor value.

7. A digital compensation circuit for calibrating a sensor comprising:

an interface circuit for receiving data relating to a plurality of temperature parameters; and first means coupled to the interface circuit for providing polynomial compensation of a first temperature coefficient (TC1), the first polynomial compensation means including means for providing a first outputs, the first output being a first value multiplied with a digitized temperature, and first adder or multiplier accumulator means coupled to the first output providing means and the interface circuit for adding a second value with the first output; and second means coupled to the interface circuit for providing polynomial compensation of a high order temperature coefficient ($TC_n$), the second polynomial compensation means including means for providing a second output, the second output being a third value multiplied with the digitized temperature, and second adder or multiplier accumulator means coupled to the second output providing means and the interface circuit for adding a fourth value with the second output.

8. The circuit of claim 7 wherein the TC1 is a temperature coefficient of the sensitivity of the sensor; and the $TC_n$ is a temperature coefficient of the sensor offset.

9. The circuit of claim 8 in which the means for providing polynomial compensation further comprise:

means for providing a first output, the first output being a first value multiplied with a digitized temperature;

means coupled to the first output providing means for providing a second output, the second output being a second value added with the first output; and second multiplying means coupled to the adder means and the interface circuit for multiplying the second output with the digital temperature.

10. The circuit of claim 9 wherein a digital temperature is represented by a digital data word or is indicated by a pulse density of a serial bit stream.

11. The circuit of claim 10 in which the TC is a temperature coefficient of the sensitivity of a sensor.

12. The circuit of claim 11 in which the TC is a temperature coefficient of the offset of a sensor.

13. A method for calibrating a sensor comprising the steps of:

(a) receiving data relating to a plurality of temperature parameters; and (b) providing polynomial compensation of a temperature coefficient (TC), the step of providing polynomial compensation including the steps of:

(b1) providing a first output, the first output being a digital temperature multiplied by a first value; and (b2) adding a second value to the first output.

14. The method of claim 13 in which the step of providing polynomial compensation further comprises:

(b1) providing a first output, the first output being a digital temperature multiplied by a first value;

(b2) providing a second output, the second output being a second value added to the first output; and (b3) multiplying the second output by the digital temperature.

15. The method of claim 14 wherein the digital temperature is represented either by a digital word or is indicated by a pulse density of a serial bit stream.

16. A method for calibrating a sensor comprising the steps of:

a) receiving data relating to a plurality of temperature parameters;

b) providing polynomial compensation of a first temperature coefficient (TC1), the step of providing polynomial compensation of the first temperature coefficient including the steps of:

(b1) providing a first output, the first output being a digital temperature multiplied by a first value; and (b2) adding a second value to the first output; and c) providing polynomial compensation of a high order temperature coefficient ($TC_n$), the step of providing polynomial compensation of the high order temperature coefficient including the steps of:

(b1) providing a second output, the second output being a digital temperature multiplied by a third value; and (b2) adding a fourth value to the second output.

* * * * *